United States Patent
Luu et al.

(10) Patent No.: US 6,647,481 B1
(45) Date of Patent: Nov. 11, 2003

(54) METHOD FOR ACCESSING DATA STORAGE LOCATIONS HAVING ADDRESSES WITHIN A HIDDEN LOGICAL ADDRESS RANGE

(75) Inventors: Vu V. Luu, Milpitas, CA (US); Xuejian Fu, Fremont, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 120 days.

(21) Appl. No.: 10/062,927

(22) Filed: Jan. 31, 2002

(51) Int. Cl.$^7$ ................................................ G06F 12/10
(52) U.S. Cl. ........................................ 711/206; 711/165
(58) Field of Search ................................. 711/206, 202, 711/203, 165, 163

(56) References Cited

U.S. PATENT DOCUMENTS

| | | | |
|---|---|---|---|
| 5,255,379 A | * 10/1993 | Melo | ........................ 711/202 |
| 5,586,301 A | 12/1996 | Fisherman et al. | |
| 6,192,471 B1 | 2/2001 | Pearce et al. | |
| 6,324,627 B1 | 11/2001 | Kricheff et al. | |
| 6,469,705 B1 | * 10/2002 | Belley | ........................ 345/557 |
| 2003/0133574 A1 | * 7/2003 | Caronni et al. | ............. 380/277 |

* cited by examiner

*Primary Examiner*—Hiep T. Nguyen
(74) *Attorney, Agent, or Firm*—Milad G. Shara, Esq.; Robroy R. Fawcett, Esq.

(57) ABSTRACT

The invention relates to a method for accessing data in a hidden area of a physical disk drive. The physical disk drive reports a user logical address range during booting the host computer or configuring an operating system for maintaining a file system, but does not report a hidden logical address range. A virtual disk drive is created that has a virtual logical address range that is reported to the operating system. A driver program is invoked for remapping addresses of the virtual logical address range with addresses of the hidden logical address range. When the file system makes a disk request directed to accessing a file in the virtual logical address range, the disk request is remapped from the virtual logical address range to the hidden logical address range. A command is transmitted to the physical disk drive using the remapped file address range.

15 Claims, 5 Drawing Sheets

| PROTECTED PARTITION (PP) COMMANDS ||
|---|---|
| REGISTER | VALUE |
| FEATURES | 57h (key, ASCII "W") |
| SECTOR COUNT | 44h (key, ASCII "D") |
| SECTOR NUMBER | 43h (key, ASCII "C") |
| CYLINDER LOW | 03h = RETURN PP START LBA<br>04h = RETURN PP SIZE<br>07h = OPEN PP<br>08h = CLOSE PP |
| CYLINDER HIGH | 00h |
| COMMAND | 8Ah (VENDOR UNIQUE) |

FIG. 4

METHOD FOR ACCESSING DATA STORAGE LOCATIONS HAVING ADDRESSES WITHIN A HIDDEN LOGICAL ADDRESS RANGE

BACKGROUND OF THE INVENTION

1. Field of the Invention

The present invention relates to digital information storage, and more particularly, to a computer system and method for accessing a hidden and protected partition of a disk drive.

2. Description of the Prior Art

A disk drive provides a nonvolatile disk media for storage of user and application information under exclusive control of a host computer. During manufacture, the disk media is generally divided into a disk management partition and a general user partition. The disk management partition holds information, related to the configuration of the disk drive and the physical format of the disk media, that generally remains unaltered after the disk drive is shipped from the manufacturer. The disk management partition is accessed using commands commonly referred to as "native" commands. The user partition is accessed using industry standard commands that specify the location of the information being accessed.

The general user partition must be partitioned into one or more logical drives and logically formatted before information is stored on it. The partitioning and formatting process generally destroys any existing information stored in the user partition.

Accordingly, there exists a need for a disk drive and related techniques that permit storage and later update of information that may not be deleted or destroyed during a subsequent logical partitioning and formatting process. The present invention satisfies this need.

SUMMARY OF THE INVENTION

The present invention may be embodied in a method for accessing data in a physical disk drive connectable to a host computer having an operating system which maintains a file system. The physical disk drive may report a user logical address range in relation to booting the host computer or configuring the operating system for maintaining the file system, and does not report a hidden logical address range in relation to booting the host computer or configuring the operating system. In the method, a virtual disk drive is created. The virtual disk drive has a virtual logical address range that is reported to the operating system for maintaining the file system. A driver program is invoked for relating addresses of storage locations in the virtual logical address range with addresses for storage locations in the hidden logical address range. The driver program is executed when the file system makes a disk request directed to accessing a file having an file address range associated with the virtual logical address range. The disk request is remapped from the virtual logical address range to the hidden logical address range. A command is transmitted to the physical disk drive to access data in the hidden logical address range for responding to the disk request.

In more detailed features of the invention, the driver program may provide a local device driver handle to an application program that invokes the driver program, and the invoking application program may provide a local application handle to the driver program for securing, to only the invoking application program, access to the data storage locations in the hidden logical address range. The invoking application program may transfer data between data storage locations in the user logical address range and data storage locations in the hidden logical address range using the virtual disk drive. Alternatively, the driver program may provide a driver process identification to an application program that invokes the driver program, and the invoking application program may provide an application process identification to the driver program for securing access to the data storage locations in the hidden logical address range.

In more detailed features of the invention, the physical disk drive may not be responsive to data access commands directed to the hidden logical address range until after the physical disk drive receives a command to open the hidden logical address range. Similarly, the physical disk drive may not be responsive to data access commands directed to the hidden logical address range after the physical disk drive receives a command to close the hidden logical address range. Also, the physical disk drive may not be responsive to data access commands directed to the hidden logical address range until after the physical disk drive receives a password for allowing access to the hidden logical address range.

BRIEF DESCRIPTION OF THE DRAWINGS

The accompanying drawings illustrate embodiments of the present invention and, together with the description, serve to explain the principles of the invention.

FIG. 4 is a table of protected partition commands.

DETAILED DESCRIPTION

Figure 1:
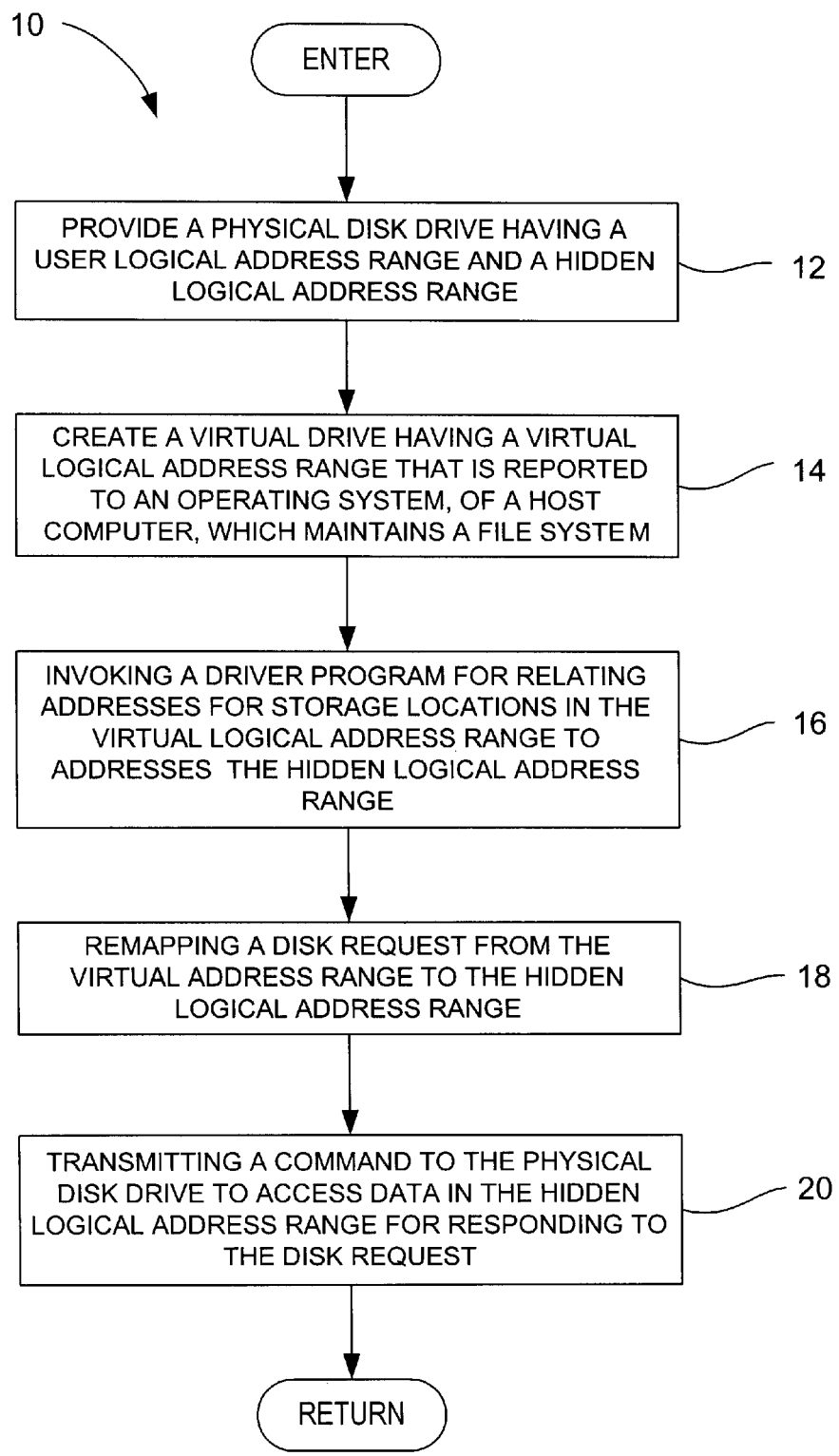
FIG. 1 is a flow chart illustrating an embodiment of a method for accessing data storage locations having addresses within a hidden logical address range.
Figure 2:
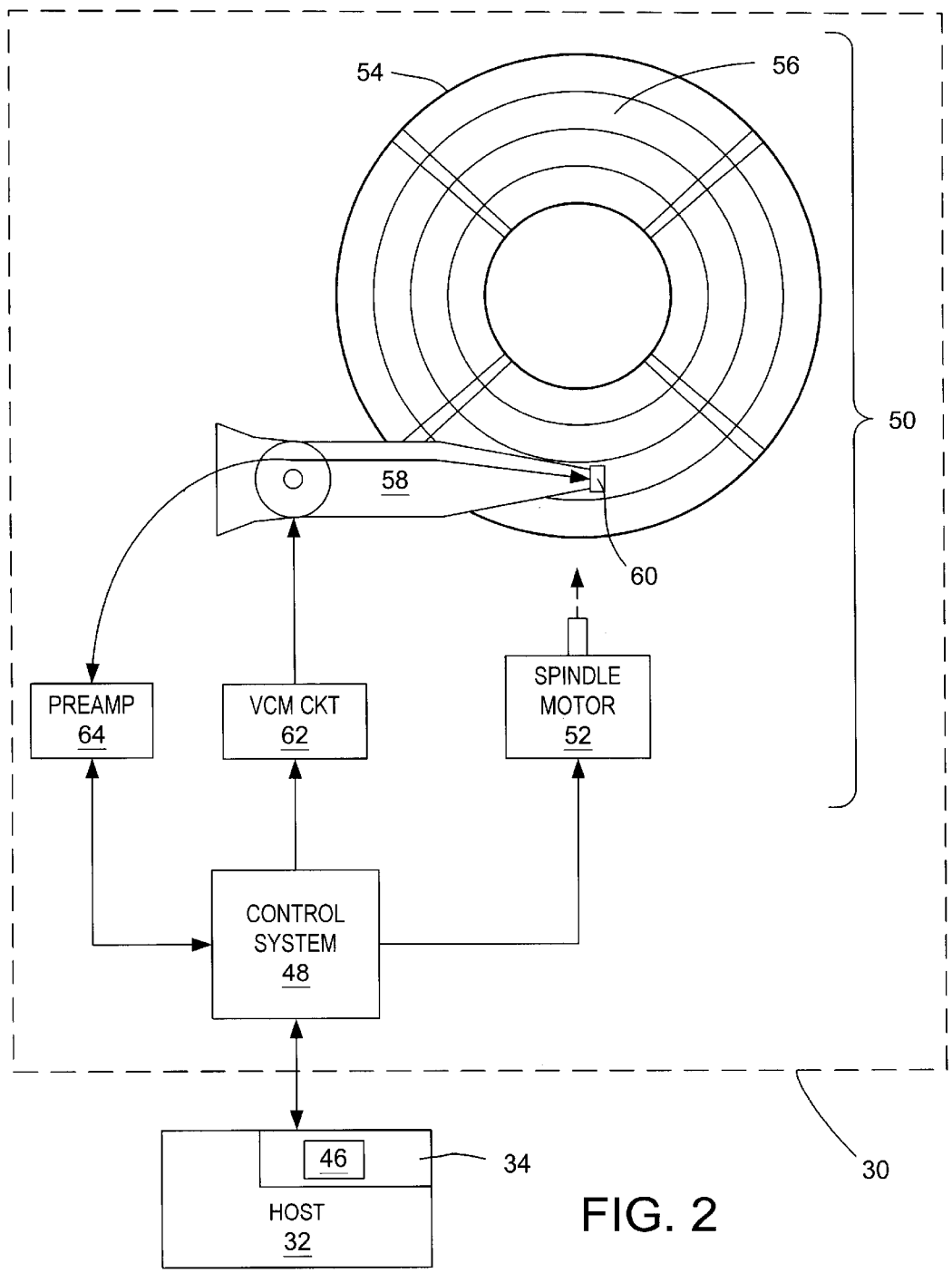
FIG. 2 is a block diagram of a computer system having a host computer connected to a physical disk drive for implementing the hidden logical address range access method of FIG. 1.
Figure 3:
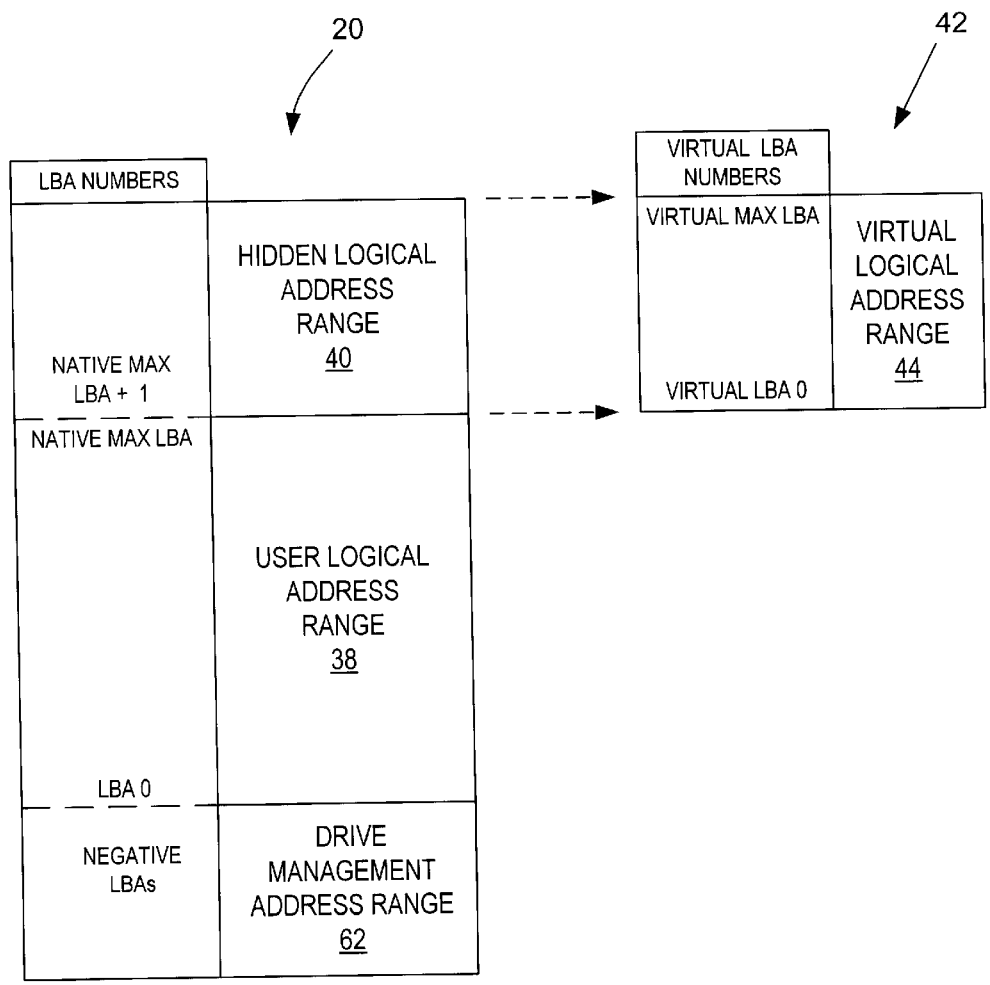
FIG. 3 is a schematic diagram of logical address ranges showing a relationship between a hidden logical address range of a physical disk drive and a virtual logical address range of a virtual disk drive.

With reference to FIGS. 1 through 3, the invention may be embodied in a method 10 for accessing data in a physical disk drive 30 connectable to a host computer 32 having an operating system 34 which maintains a file system. The physical disk drive may report a user logical address range 38 in relation to booting the host computer or configuring the operating system for maintaining the file system, and does not report a hidden logical address range 40 in relation to booting the host computer or configuring the operating system (step 12). In the method, a virtual disk drive 42 is created (step 14). The virtual disk drive has a virtual logical address range 44 that is reported to the operating system for maintaining the file system. A driver program 46 is invoked for relating addresses of storage locations in the virtual logical address range 44 with addresses for storage locations in the hidden logical address range 40 (step 16). The driver program is executed when the file system makes a disk request directed to accessing a file having an file address range associated with the virtual logical address range. The disk request is remapped from the virtual logical address range to the hidden logical address range (step 18). A command is transmitted to the physical disk drive to access data in the hidden logical address range for responding to the disk request (step 20).

The user logical address range 38 may reside in a general user partition of the disk drive and the hidden logical address range 40 may reside in a protected partition. The protected partition may be configured by the original disk drive manufacturer. With reference to FIG. 4, the size of the protected partition may be determined by sending a return protected partition start logical block address (LBA) command and a return protected partition size command to the disk drive. The protected partition may need to be opened before access is granted and may be closed to prevent unauthorized access using respective protected partition commands. The protected partition commands may be password protected (e.g., "WDC").

The disk drive 30 (FIG. 2) includes a control system 48 and a head-disk assembly (HDA) 50. The control system includes circuitry and processors that control the HDA and that provide an intelligent interface between the host 32 and the HDA for execution of read and write commands. The control system may have an internal microprocessor and nonvolatile memory for implementing the techniques of the invention. Program code for implementing the techniques of the invention may be stored in the nonvolatile memory and transferred to volatile random access memory (RAM) for execution by the microprocessor. The HDA 50 may include a spindle motor 52, at least one disk 54 having a magnetic media surface 56 for providing addressable storage locations, a rotary actuator 58, a transducer head 60, a voice coil motor (VCM) circuit 62, and a preamplifier 64.

The magnetic media surface 56 is accessed using the head 60 and may be divided into data storage locations or sectors, each generally storing 512 data bytes. Each sector may be addressed using a logical block address (LBA). A linear addressing scheme using the LBAs for addressing the sectors is shown in FIG. 3. The data storage locations are organized into the user logical address range 38 and the hidden logical address range 40. The user logical address range may be assigned to LBA numbers 0 through a native maximum (MAX) LBA. The hidden logical address range may be assigned to LBA numbers above the native MAX LBA. The addresses may further include a host-protected address range (not shown) just below the native MAX LBA, and a drive management address range 62 generally assigned to negative LBA numbers. The host computer 12 may access the data storage locations in the user logical address range and in the hidden logical address range using an industry standard interface protocol such as the AT Attachment (ATA) Interface between host computers and storage devices.

The operating system 34 of the host computer 12 may not be aware of the hidden logical address range 40 because, during boot of the host computer and the operating system, the disk drive 30 may return only the MAX LBA value in response to a read MAX LBA command. Access to the hidden logical address range may be obtained using the driver program 46 that registers a virtual disk drive 42 with the operating system 34. The operating system may assign a unique drive letter to the virtual disk drive. The driver program may define the virtual logical address range 44, e.g., virtual LBA 0 through virtual MAX LBA.

Figure 5:
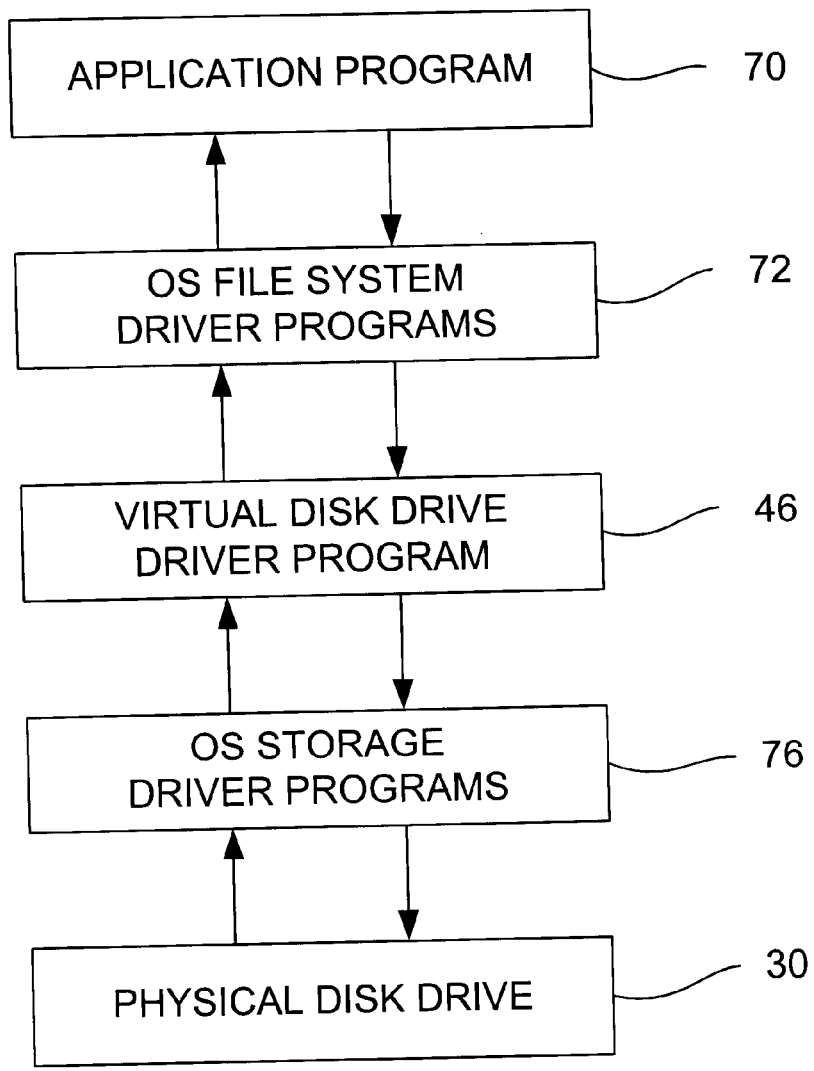
FIG. 5 is a schematic diagram of software layers for describing the hidden logical address range access method of FIG. 1.

With reference to FIG. 5, an application program 70 accesses a file in the hidden logical address range 40 on the physical disk drive 30 by referencing the file using the assigned drive letter for the virtual disk drive 42. The operating system 34 has a file system driver program 72 that sends data access commands referencing LBAs in the virtual logical address range 44 to the virtual disk drive driver program 46. The driver program 46 remaps the LBAs in the data access commands to the hidden logical address range. Operating system storage drivers programs 76 send the remapped LBA data access commands to the physical disk drive. If the access has been properly authorized, the physical disk drive responds to the remapped LBA access command.

For security purposes, the operating system 34 may provide a local device driver handle (Windows) or a device driver process identification (UNIX) only to an application program 70 that invokes the virtual disk drive driver program 46. After the invoking application program has completed access to the hidden logical address range 40 using the virtual logical address range 44, the virtual disk drive 42 may be "disconnected" by uninstalling the virtual drive driver program and unregistering the assigned virtual disk drive letter from the operating system.

The access techniques of the invention are particularly advantageous for transparent updating of data stored in the hidden logical address range 40. New data may be stored in a temporary directory in a file system within the user logical address range 38. The application program 70 invokes the virtual disk drive driver program 46. The driver program 46 configures the virtual disk drive 42 for use by the application program. The application program transfers the new data from the temporary directory to files of a file system within the hidden logical address range. After the new data has been transferred, the application program closes the hidden logical address range, directs unloading of the driver program, and deletes the temporary directory.

We claim:

1. A method for accessing data in a physical disk drive connectable to a host computer having an operating system which maintains a file system, wherein the physical disk drive may report a user logical address range in relation to booting the host computer or configuring the operating system for maintaining the file system, and the physical disk drive does not report a hidden logical address range in relation to booting the host computer or configuring the operating system, the method comprising:

creating a virtual disk drive, wherein the virtual disk drive has a virtual logical address range that is reported to the operating system for maintaining the file system;

invoking a driver program for relating addresses of storage locations in the virtual logical address range with addresses for storage locations in the hidden logical address range, wherein the driver program is executed when the file system makes a disk request directed to accessing a file having an file address range associated with the virtual logical address range;

remapping the disk request from the virtual logical address range to the hidden logical address range; and transmitting a command to the physical disk drive to access data in the hidden logical address range for responding to the disk request.

2. A method for accessing data in a physical disk drive as defined in claim 1, wherein the driver program provides a local device driver handle to an application program that invokes the driver program, and the invoking application program provides a local application handle to the driver program for securing, to only the invoking application program, access to the data storage locations in the hidden logical address range.

3. A method for accessing data in a physical disk drive as defined in claim 2, wherein the invoking application program transfers data between data storage locations in the user logical address range and data storage locations in the hidden logical address range using the virtual disk drive.

4. A method for accessing data in a physical disk drive as defined in claim 1, wherein the driver program provides a driver process identification to an application program that invokes the driver program, and the invoking application program provides a application process identification to the driver program for securing, to only the invoking application program, access to the data storage locations in the hidden logical address range.

5. A method for accessing data in a physical disk drive as defined in claim 1, wherein the physical disk drive is not responsive to data access commands directed to the hidden logical address range until after the physical disk drive receives a command to open the hidden logical address range.

6. A method for accessing data in a physical disk drive as defined in claim 1, wherein the physical disk drive is not responsive to data access commands directed to the hidden logical address range after the physical disk drive receives a command to close the hidden logical address range.

7. A method for accessing data in a physical disk drive as defined in claim 1, wherein the physical disk drive is not responsive to data access commands directed to the hidden logical address range until after the physical disk drive receives a password for allowing access to the hidden logical address range.

8. A physical disk drive connectable to a host computer having an operating system which maintains a file system, comprising:

means for reporting a user logical address range in relation to booting the host computer or configuring the operating system for maintaining the file system, and not reporting a hidden logical address range in relation to booting the host computer or configuring the operating system;

means for creating a virtual disk drive, wherein the virtual disk drive has a virtual logical address range that is reported to the operating system for maintaining the file system;

means for invoking a driver program for relating addresses of storage locations in the virtual logical address range with addresses for storage locations in the hidden logical address range, wherein the driver program is executed when the file system makes a disk request directed to accessing a file having an file address range associated with the virtual logical address range;

means for remapping the disk request from the virtual logical address range to the hidden logical address range; and means for transmitting a command to the physical disk drive to access data in the hidden logical address range for responding to the disk request.

9. A physical disk drive as defined in claim 8, wherein the physical disk drive is not responsive to data access commands directed to the hidden logical address range until after the physical disk drive receives a command to open the hidden logical address range.

10. A physical disk drive as defined in claim 8, wherein the physical disk drive is not responsive to data access commands directed to the hidden logical address range after the physical disk drive receives a command to close the hidden logical address range.

11. A physical disk drive as defined in claim 8, wherein the physical disk drive is not responsive to data access commands directed to the hidden logical address range until after the physical disk drive receives a password for allowing access to the hidden logical address range.

12. A computer system comprising:

a host computer having an operating system which maintains a file system; and a physical disk drive, coupled to the host computer, having physical disk drive means for reporting a user logical address range in relation to booting the host computer or configuring the operating system for maintaining the file system, and not reporting a hidden logical address range in relation to booting the host computer or configuring the operating system;

means for creating a virtual disk drive, wherein the virtual disk drive has a virtual logical address range that is reported to the operating system for maintaining the file system;

means for invoking a driver program for relating addresses of storage locations in the virtual logical address range with addresses for storage locations in the hidden logical address range, wherein the driver program is executed when the file system makes a disk request directed to accessing a file having an file address range associated with the virtual logical address range;

means for remapping the disk request from the virtual logical address range to the hidden logical address range; and means for transmitting a command to the physical disk drive to access data in the hidden logical address range for responding to the disk request.

13. A computer system as defined in claim 12, wherein the physical disk drive is not responsive to data access commands directed to the hidden logical address range until after the physical disk drive receives a command to open the hidden logical address range.

14. A computer system as defined in claim 12, wherein the physical disk drive is not responsive to data access commands directed to the hidden logical address range after the physical disk drive receives a command to close the hidden logical address range.

15. A computer system as defined in claim 12, wherein the physical disk drive is not responsive to data access commands directed to the hidden logical address range until after the physical disk drive receives a password for allowing access to the hidden logical address range.

* * * * *